(12) United States Patent
Lenz

(10) Patent No.: US 7,091,632 B2
(45) Date of Patent: Aug. 15, 2006

(54) STABILIZATION CIRCUIT FOR COMPENSATING FLUCTUATIONS IN A VOLTAGE AT A USER

(75) Inventor: Helmut Lenz, Oberasbach (DE)

(73) Assignee: Siemens Aktiengesellschaft, Munich (DE)

( * ) Notice: Subject to any disclaimer, the term of this patent is extended or adjusted under 35 U.S.C. 154(b) by 526 days.

(21) Appl. No.: 10/266,293

(22) Filed: Oct. 8, 2002

(65) Prior Publication Data

US 2003/0080629 A1    May 1, 2003

(30) Foreign Application Priority Data

Oct. 9, 2001    (DE)    ................................ 101 49 827

(51) Int. Cl.
*H02J 3/24* (2006.01)

(52) U.S. Cl. ...................................... 307/102; 307/103
(58) Field of Classification Search ................. 307/102, 307/103
See application file for complete search history.

(56) References Cited

U.S. PATENT DOCUMENTS

| 4,988,922 | A | * | 1/1991 | Shoda et al. ................. 315/223 |
| 5,610,501 | A | | 3/1997 | Nelson et al. |
| 5,633,577 | A | * | 5/1997 | Matsumae et al. ............. 322/37 |
| 6,118,676 | A | * | 9/2000 | Divan et al. .................. 363/34 |
| 6,172,488 | B1 | * | 1/2001 | Mizutani et al. ............ 323/207 |
| 2002/0017898 | A1 | * | 2/2002 | Bayer et al. ................. 323/313 |

FOREIGN PATENT DOCUMENTS

| AT | PS 404 527 | 12/1998 |
| DE | OS 198 11 932 | 9/1999 |
| JP | 4-334930 | 9/1995 |

OTHER PUBLICATIONS

AC voltage hybrid filter, Koczara, W.; Dakyo, B.; Telecommunications Energy Conference, 1999. INTELEC '99. The 21st International, Jun. 6-9, 1999 pp. 8 pp.*

* cited by examiner

*Primary Examiner*—Brian Sircus
*Assistant Examiner*—Daniel Cavallari
(74) *Attorney, Agent, or Firm*—Schiff Hardin LLP

(57) ABSTRACT

A stabilization circuit wherein voltages of the secondary winding of a transformer are stabilized with respect to mains voltage fluctuations and load fluctuations, an auxiliary voltage is derived either from a secondary winding of the transformer or an auxiliary transformer. Together with the mains voltage portion of this auxiliary voltage acquired by pulse-width modulation forms the primary voltage of the transformer such that the desired stabilization is achieved.

12 Claims, 4 Drawing Sheets

STABILIZATION CIRCUIT FOR COMPENSATING FLUCTUATIONS IN A VOLTAGE AT A USER

BACKGROUND OF THE INVENTION

1. Field of the Invention

The present invention is directed to a circuit for compensating fluctuations of mains voltage and load voltage at a user and, in particular, to such a stabilization for users with anticipated, definable fluctuations in load voltage.

2. Description of the Prior Art

Electronic devices are usually very sensitive to voltage fluctuations in the supply network. In the case of a gradient amplifier in medical technology, for example, voltage fluctuations can distort the current pulses emitted by the amplifier, and thus falsify measured results.

Voltage fluctuations are partly caused by load fluctuations of the devices themselves. Dependent on the measurement sequence, thus, a gradient amplifier at different times represents very different loads for its power supply that can cause voltage fluctuations.

Fluctuations in the network can be intercepted by means of a preceding, interruption-free power supply (USV) or by switching transformer windings of the power pack device. Fluctuations in load voltage as occur in a gradient amplifier are alleviated by an electronic power pack or by an overdimensioned transformer circuit of the device to be stabilized. A collapse of the secondary voltage of the transformer of the device to be stabilized due to a load, however, is usually not compensated.

U.S. Pat. No. 5,610,501 discloses a power flow regulator for a transmission line. The power flow regulator is thereby connected to the transmission line via a shunt transformer and a series transformer and has a rectifier circuit that is supplied by the shunt transformer and comprises an inverter (A.C. converter) supplied by the rectifier circuit that injects an alternating voltage, via the series transformer, that has a controllable amplitude and phase angle with respect to the phase of the transmission line.

SUMMARY OF THE INVENTION

An object of the present invention is to provide a simple circuit with which fluctuations in mains and/or load voltage can be compensated with infinite variation. This object is achieved according to the invention in a patent stabilization circuit for compensating voltage fluctuations at a device (user), the stabilization circuit having a transformer and a switched power pack, the primary winding of the transformer being coupled to the mains voltage and the switched power pack being coupled to the secondary winding of the transformer. One output of the switched power pack is coupled to a pole of the mains voltage, and the device circuitry is coupled to the other output of the switched power pack and the other pole of the mains voltage. The voltage at the device circuitry is stabilized by the switched power pack producing an additional voltage or load or in the event of fluctuations in the mains voltage, the additional voltage being added to the mains voltage at the device circuitry.

The coupling between the transformer and the switched power pack can be designed such that the secondary winding of the transformer already supplies the switched power pack with a voltage in the same direction as the mains voltage. This enables a simple design of the switched power pack, which merely switches the secondary winding of the transformer in series with the device circuitry in the event of a load change.

The switched power pack can be coupled to a secondary winding of the transformer and the load coupled to another secondary winding of the transformer, with one output of the switched power pack being coupled to a pole of the mains voltage and the other output of the switched power pack being coupled to a terminal of the primary winding of the transformer, and the other terminal of the primary winding of the transformer being coupled to the other pole of the mains voltage. In this case, the voltage at the primary winding of the transformer is composed of the mains voltage and the voltage output by the switched power pack, which is supplied by a secondary winding of the transformer. This circuit is advantageous when the device to be stabilized already has a transformer with a multiple secondary windings, since a second transformer can be foregone in this case.

The switched power pack can include a rectifier circuit for rectifying the voltage produced at the secondary winding of the transformer and a bridge circuit for switching the voltage rectified by the rectifier circuit. The input of the bridge circuit which is composed of switch elements, is coupled to the output of the rectifier circuit and the output of the bridge circuit is coupled to the two outputs of the switched power pack.

A charging capacitor can be utilized for smoothing the voltage output by the rectifier circuit. Disturbing parts of the voltage can be removed by a filter coupled to the output of the power pack.

The bridge circuit composed of switch elements can be pulse-width modulated according to the voltage drop at the device circuitry.

An inductance converter that is arranged between the rectifier circuit and the bridge circuit of switch elements alternatively can also be employed for pulse-width modulation.

The inventive circuit can be especially advantageously employed in medical diagnostic apparatuses such as, for example, magnetic resonance tomography, X-ray installations and computed tomography systems. The present invention therefore is also directed to a medical diagnosis apparatus including the inventive circuit.

DESCRIPTION OF THE PREFERRED EMBODIMENTS

Figure 1:
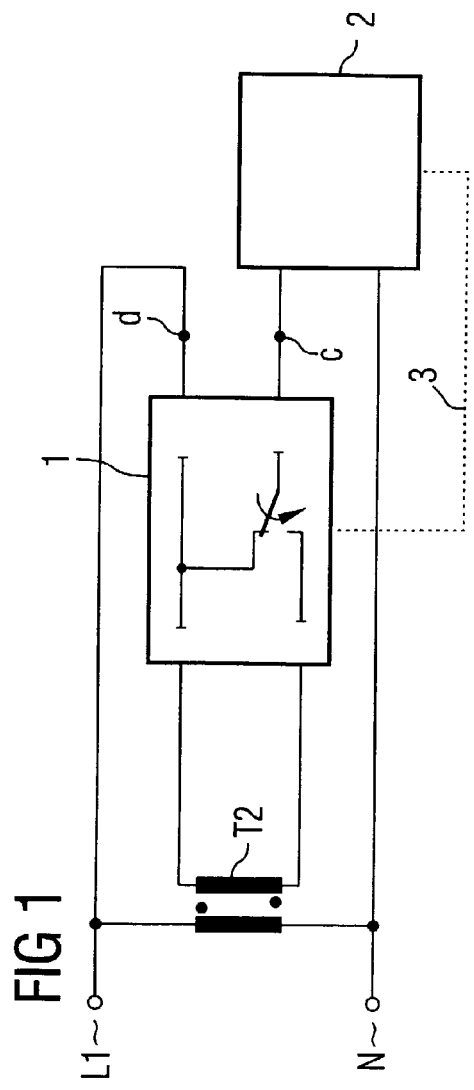
FIG. 1 illustrates the basic components of a first exemplary embodiment of the inventive stabilization circuit.

FIG. 1 shows the basic components of a first exemplary embodiment of the inventive stabilization circuit. The device 2 to be stabilized has one terminal connected to an output c of a switched power pack part 1 and has another terminal connected directly to the neutral conductor N~ of the supply network. The switched power pack 1 has an input side connected to the secondary winding of the transformer T2.

The transformer T2, which has a primary side connected to the network L1~, N~, is designed such or coupled to the switched power pack 1 so that the secondary winding generates a voltage in the same direction as the mains voltage.

In normal operation, the outputs c and d in the switched power pack 1 are shorted, so that the mains voltage L1~, N~ is across the device 2. When the voltage at the device 2 drops below a specific value as a result of mains and/or load voltage fluctuations, the switched power pack 1 connects the two outputs c and d to the two terminals of the secondary winding of the transformer T2, which drives an additional current through the device 2 and compensates the voltage fade. Although the voltage at the primary winding of the transformer T2 will continue to drop as a result of the load caused by the cut-in secondary winding of the transformer and the existing internal resistance of the network, this can be easily compensated by the inventive circuit since this voltage drop is slight in comparison to the voltage output by the switched power pack 1 and the transformer T2 is correspondingly adapted therefor. The transformer T2 can be designed such that anticipated voltage fades can be compensated by means of the voltage output by the secondary winding of the transformer T2.

In the exemplary embodiment shown in FIG. 1, the device 2 is a gradient amplifier that loads the network differently dependent on the operating condition, with the load arising upon switching of the gradient amplifier being predictable or calculatable. The transformer T2 is designed such that, in the load case wherein the switched power pack 1 connects the two outputs c and d to the two terminals of the secondary winding of the transformer T2, the secondary winding of the transformer T2 injects an additional voltage that compensates the voltage fade due to the switching of the gradient amplifier and as a result of the load due to the cut-in secondary winding of the transformer. It can be easily seen that the switched power pack part 1 in this example of the inventive circuit can be built in a very simple way due to the simple cut-in of the secondary winding of the transformer T1. In particular, complex rectifier circuits and inverse rectifiers can be foregone. As shown in FIG. 1, the drive of the switch in the switched power pack 1 ensues by means of a control line 3 proceeding from the device 2 or, for example, by detecting the flow of current to the device 1 (not shown).

Figure 2:
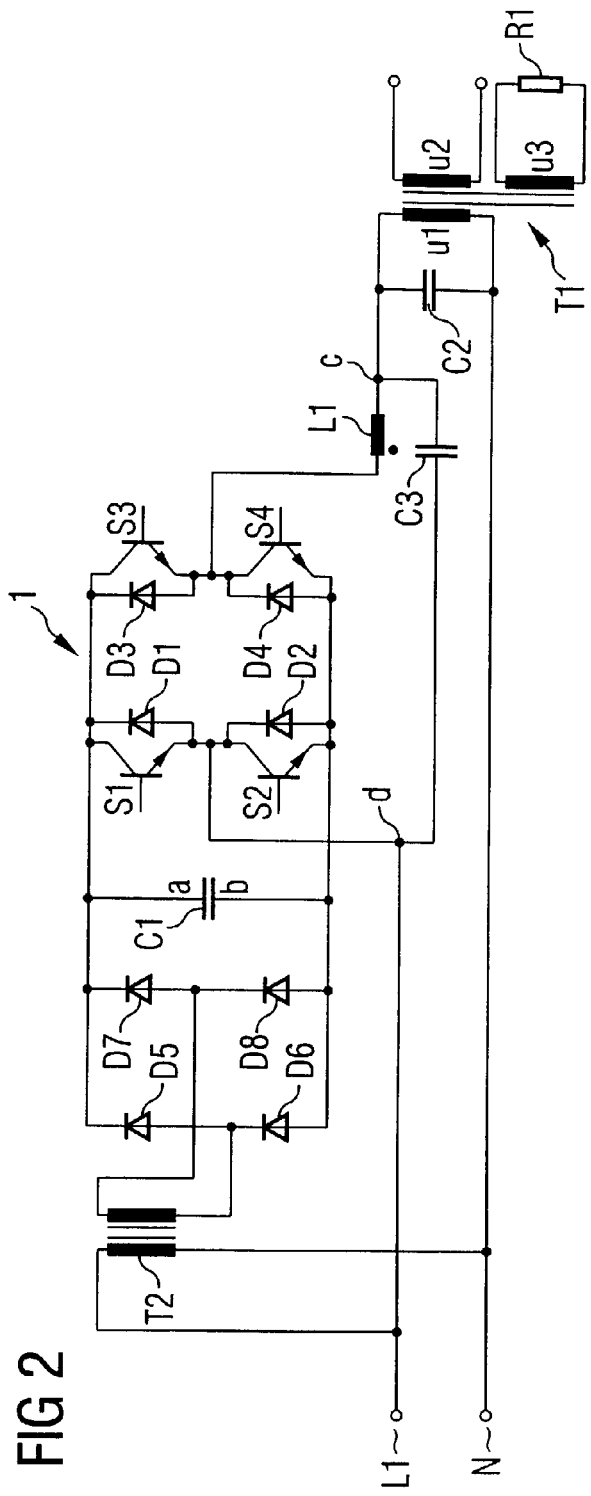
FIG. 2 is a circuit diagram of the embodiment of the switched power pack of the inventive stabilization circuit in a second exemplary embodiment.

FIG. 2 shows a detailed version of a further exemplary embodiment of the switched power pack 1. In this example, the user 2 to be stabilized is the transformer T1 (for example, power pack part of a gradient amplifier) to which a resistor R1 (alternating load) is connected at one of the two secondary windings of the transformer T1. One terminal of the primary winding of the transformer T1 is connected to one terminal c of the switched power pack 1, and the other terminal of the primary winding of the transformer T1 is connected to the neutral conductor N~ of the mains voltage.

The switched power pack 1 is supplied by the secondary winding of the transformer T2. The voltage across the secondary winding of the transformer T2 is rectified with a rectifier circuit D5 through D8, so that the voltage at the terminal a of the charging capacitor C1 is positive compared to terminal b. This voltage is the supply voltage of the bridge circuit composed of the switch elements S1 through S4 to which the diodes D1 through D4 are respectively connected in parallel. The circuit symbol of an NPN transistor has been selected here as symbol for a controllable electronic switch. Together with the capacitor C3, the coil L1 forms a filter that keeps switching disturbances that are caused by the bridge circuit away from the mains transformer T1 and the network. The capacitor C2 is connected in parallel with the primary winding of the transformer T1.

Let it be assumed that the switches S2 and S4 are constantly switched on and that the switches S1 and S3 are constantly switched off. In this case, the flow of current is possible from the outer conductor L~ via the switch S2, the diode D4, the coil L1 to the transformer T1 and, in the opposite direction, from the neutral conductor N~ via the transformer T1, the coil L1, the switch S4 and the diode D2 to the outer conductor L~, and the transformer—leaving the losses out of consideration—is directly connected to the mains voltage. Since the switches S1 and S3 are switched off, flow of current from the rectifier circuit D5 through D8 via the transformer T1 is not possible.

Due to a pulse-width modulation of the switches S1 and S3, or of the switches S2 and S4, and assuming that the capacitor C1 is very large, a lower voltage than the mains voltage can be briefly set at the transformer T1, this making it possible to react to over-voltage.

Given a drop of the voltage at the resistor R1, the switch S4 is switched off and the switch S3 is switched on in alternation with a high frequency (for example, 20 kHz) when L1 is positive relative to N (positive mains half-wave), whereby the switch S2 remains switched on and the switch S1 remains switched off. The voltage at the terminal c thereby becomes higher compared to the terminal d the longer the switch S3 is switched on in relationship to the switch S4.

At the negative half-wave of the mains voltage, the switches S2 and S1 are pulse-width modulated in alternation in the same way, whereby the switch S4 remains switched on and the switch S3 remains switched off.

Given a pulse-width modulation wherein the switches S3 and S4 are switched on, for example, equally long, the amplitude of the filtered voltage at the capacitor C3 will correspond to approximately 50% of the voltage at the capacitor C1. Given a modulation of the switches S3 and S4 (switch S2 on and switch S1 off), the terminal c of the capacitor C3 becomes positive compared to the terminal d. Since the modulation of the switches S3 and S4 (given the initial condition S2, S4 constantly on) ensues only when L1 is positive compared to N (positive half-wave), the primary voltage of the transformer T1 becomes greater at the positive mains half-wave.

The magnitude of the primary voltage at the transformer T1 increases at the negative half-wave (L1 is negative compared to N) when the switches S1 and S2 are pulse-width modulated, since the terminal c of the capacitor C3 is negative compared to the terminal d.

Using this pulse-width modulation, this means that the voltage at the primary winding of the transformer T1 can be increased from the amount of the mains voltage by the magnitude of the voltage output by the secondary winding of the transformer T2.

The same effect is achieved when, given an output voltage zero of the switched power pack part 1, the switches S1 and S3 are switched on and the switches S2 and S4 are constantly switched off.

In order to increase the voltage at the transformer T1, the switches S1 and S2 are modulated here at positive mains half-wave, whereby the switch S3 remains switched on and the switch S4 remains switched off; at negative mains half-wave, the switches S3 and S4 are modulated, the switch S1 remains switched on and the switch S2 remains switched off.

Further modulation methods can be implemented with the switched power pack part 1. For example, modulation wherein the switches S1 and S4, or the switches S2 and S3, are simultaneously switched on is thus possible. When the on duration of the switches S1 and S4, or of the switches S2 and S3, is selected equally long, then no voltage is output on average over a switching cycle. When, in contrast, the on-duration of the switches S2 and S3 is longer than the on-duration of the switches S1 and S4, then the terminal c becomes positive on average compared to the terminal d over a switching cycle.

Figure 3:
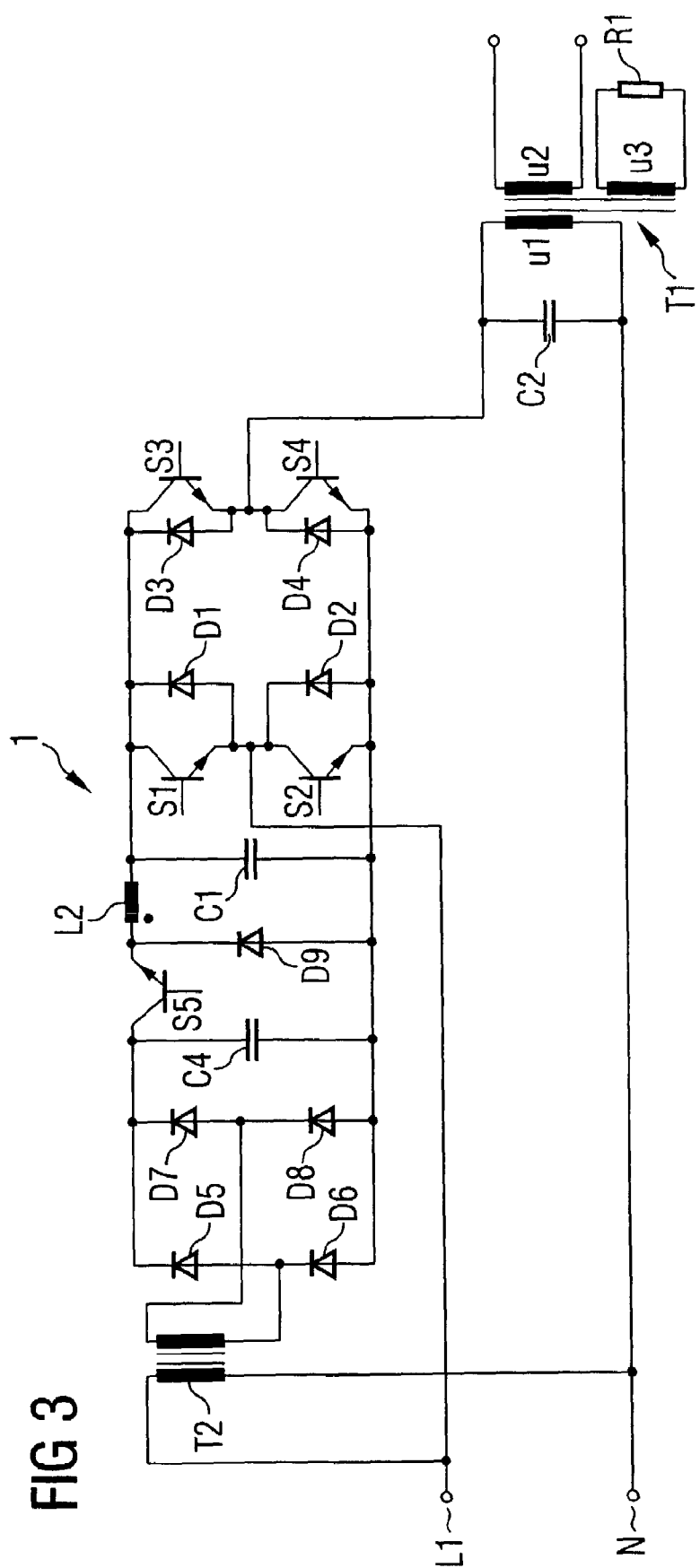
FIG. 3 shows another detailed version of the embodiment according to the second exemplary embodiment.

FIG. 3 shows a further version of the inventive stabilization circuit wherein the bridge circuit of switch elements S1 through S4 does not produce the pulse-width modulation but functions as an inverse rectifier.

In this example, the rectifier circuit D5 through D8 charges the capacitor C4. The switches S5, the diode D9 and the coil L2 form an induction converter that is controlled by pulse-width modulation and outputs the modulated voltage via the capacitor C1 to the bridge circuit composed of the switch elements S1 through S4.

The switch elements S1 through S4 are switched with mains frequency. When L1 is positive, then the switches S2 and S3 are switched on; when L1 is negative, then the switches S1 and S4 are switched on. An advantage of this circuit is that asymmetries in the pulse-width modulation can be avoided since only the switch S5 is pulse-width modulated and its voltage is employed both given positive and negative mains half-waves.

Figure 4:
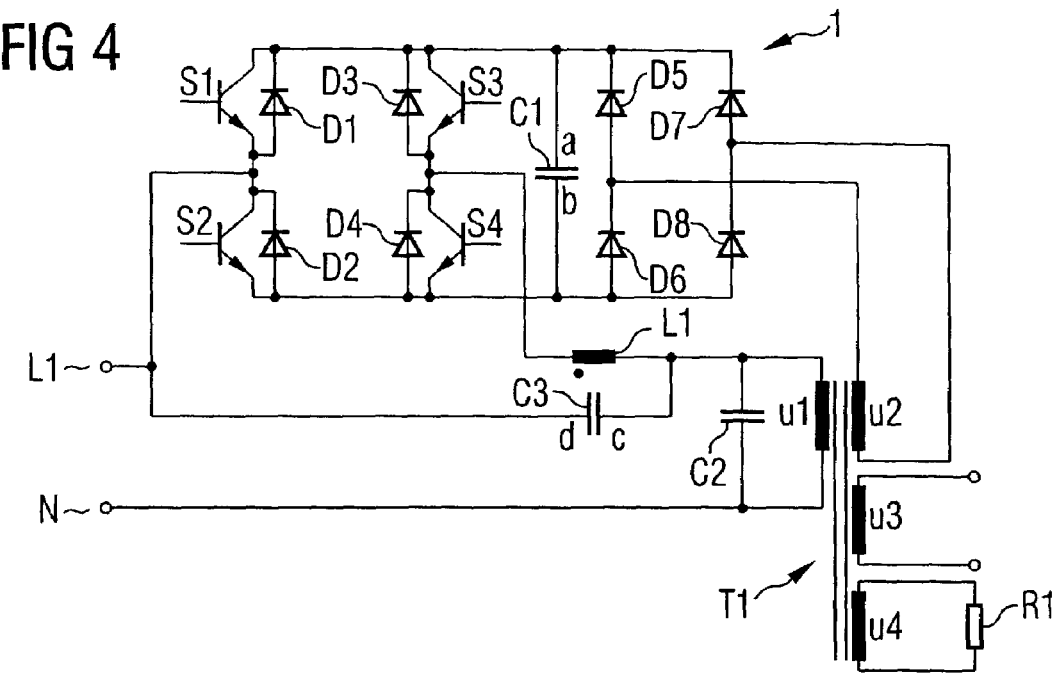
FIG. 4 is a detailed version of an embodiment according to a third exemplary embodiment; of the inventive stabilization circuit.

FIG. 4 shows a circuit wherein, like the circuit shown in FIG. 2, the bridge circuit of switch elements S1 through S4 produces the pulse-width modulation in the switched power pack 1. In this example, however, the switched power pack 1 is supplied by a secondary winding of the transformer T1. This circuit is especially advantageous when the device to be stabilized already comprises a main transformer T1 with a plurality of secondary windings, since a second transformer T2 can be foregone in this case.

The secondary winding with the output voltage U3 of the transformer is unloaded; the secondary winding with the output voltage U4 is loaded by the user R1. Of course, even more secondary windings and loads can be present. When the input voltage U1 changes, then the output voltages U3 and U4 likewise change. Assuming that the load due to the user R1 is subject to temporal fluctuations, then the voltage S4 will likewise exhibit corresponding fluctuations. The change of the load also affects the voltage U3, even though to a lesser extent, since a part of the losses of the transformer drops in the primary winding (shared by U3 and U4). A change of the load even influences the primary voltage U1, even though to an even lesser extent, since the network has an internal network resistance that is not zero.

When a fade of the transformer voltage U4 is to be compensated, then it suffices when a specific pulse-width modulation analogous to the example described in FIG. 2 is set, whereby, however, one must count on a higher voltage fade at the transformer T1 due to the cut-in of the secondary winding. The secondary voltage U4, however, can be easily boosted back to its original value by means of a corresponding increase of the primary voltage U1, whereby the secondary voltages U2 and U3 also rise again. The power for this is taken from the secondary winding with the output voltage U2.

Figure 5:
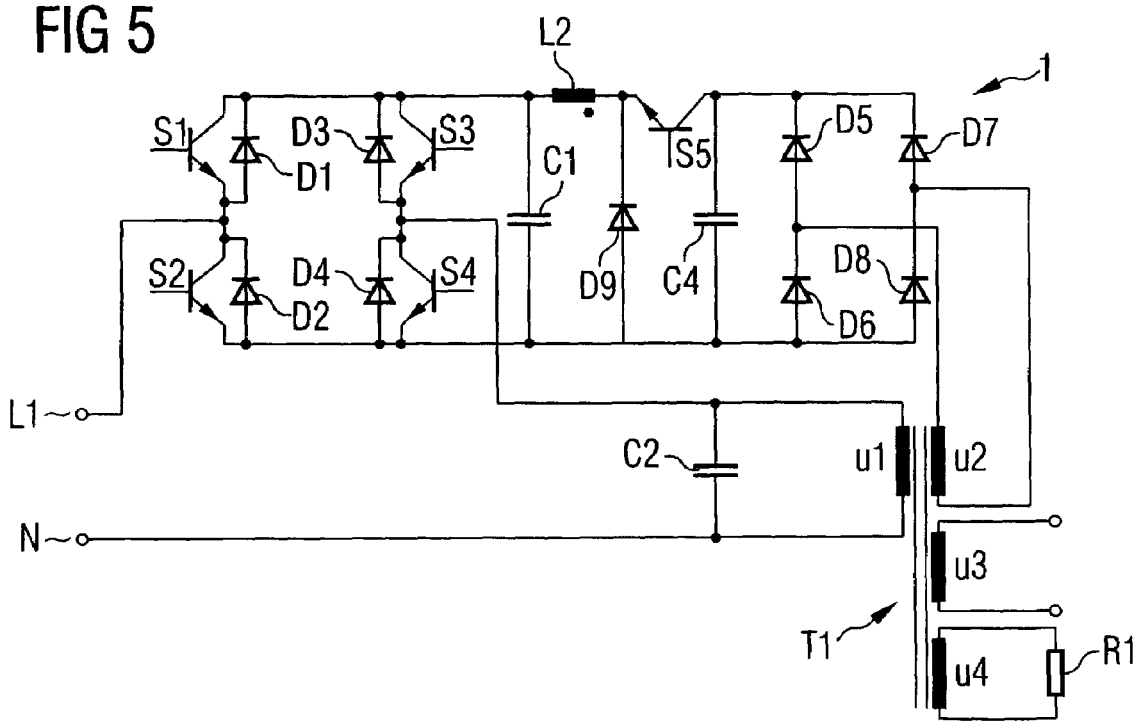
FIG. 5 is a second detailed version of the embodiment according to the third exemplary embodiment.

FIG. 5 shows another version of the example of FIG. 4 wherein the switched power pack part 1 is supplied by a secondary winding of the transformer T1, as in FIG. 4, whereby the bridge circuit of switch elements functions as inverse rectifier, as shown in FIG. 3, and the switch S5, the diode D9 and the coil L form an induction converter that is controlled by pulse-width modulation.

In the examples of FIG. 2 through FIG. 5, the bridge of switch elements S1 through S4 is inserted into the mains line L1~; however, it could also be in the neutral conductor N~.

Assuming in the circuit according to FIG. 2 that the switching times of the switch elements are not the same— one side modules with, for example, 51% despite the same drive and the other with 49%—, then the one mains half-wave is always increased more greatly than the other. A direct current in the transformer T1 is the result; the transformer T1 can proceed into saturation.

In combination with a quickly reacting regulator that can modify the pulse modulation at any time, it is possible to magnetized the transformer T1 by means of a direct current. When, in contrast, the pulse-width modulation is always kept constant for a full sine oscillation (cycle), then such a magnetization can be prevented. For example, the regulator is always allowed to modify the pulse-width modulation given a change from the negative to the positive sine half-wave or, for example, whenever the positive network amplitude is reached, whereby the pulse-width modulation is then no longer varied by the regulator for one cycle.

Further, the secondary voltage U2 should be selected such that mains over-voltages, mains under-voltages and voltage fades due to load can be leveled. A pulse-width modulation must already ensues in normal operation in order to be able to react to all of these cases.

Without load (by, for example, R1), a transformer behaves like a large inductance, i.e. current and voltage are phase-shifted by 90 degrees, the current trails the voltage. Assuming that the load by R1 in FIG. 2 is very small or completely lacking, the switch elements S1 through S4 are modulated such that the switches S2 and S4 are constantly switched on given an output voltage of zero. Assuming that the mains voltage is just positive but is heading towards zero. Then, the switches S3 and S4 are pulse-width modulated, whereby the switch S2 is constantly switched on. In the case of switch S4 on and switch S3 off, current then flows via the switch S2 and the diode D4; in the case of switch S4 off and switch S3 on, a current flows via the switch S2 and current flows via the switch S3. Energy is thereby taken from the rectifier circuit composed of D5 through D8 and from the capacitor C1.

When the voltage at L1~ is zero, then the current is at its maximum value. When L1~ becomes negative, then the pulse-width modulation changes, the switch S4 is now constantly on, the switches S1 and S2 are pulse-width modulated, whereby the current, however, still flows from L1~ to the transformer T1. When the switch S2 is switched on, then the current can again flow through the switch S2 and the diode D4 over the coil L1 to the transformer T1. When, in contrast, the switch S2 is switched off, then the current flows via the diode D1 to the terminal a of the capacitor C1; from the terminal b, the current flows farther over the diode D4 and the coil L1 to the transformer T1, whereby the capacitor C1 is charged.

The capacitor C1 must be at least so large that the voltage to which it is charged by the inductive current of the transformer does not destroy the circuit. A compensation of the inductive current can be attempted with the capacitor C2, but this will never completely succeed. The capacitor C2 could therefore be foregone but not the capacitor C1.

When the capacitor C1 is selected very large, the, even given a transformer T1 loaded by the resistor R1, the voltage at the capacitor C1 is more likely to be a direct voltage than a rectified sine voltage. Given constant pulse-width modulation (for example, 50%), a positive or negative direct voltage will therefore be added to the sine voltage of L1 dependent on the mains phase. The primary voltage U1, for example, can then appear as follows:

Start at, for example, plus 20 volts, followed by a positive sine half-wave based thereon, end at plus 20 volts, skip to minus 20 volts, negative sine half-wave, skip from minus 20 volts to plus 20 volts, etc.

This will not be harmful in many instances. When, instead of R1, a device with a rectifier circuit and a large charging capacitor (like D5 through D8 with the large C1) is connected to the secondary winding, this is even advantageous since the curve of the sine half-wave plus direct voltage is flatter than given a pure sine curve with the same amplitude.

Compared to a pure sine voltage, the flow of current in a rectifier circuit with charging capacitor will then ensue over a longer time, the charging current spike will no longer be as high. The favorable circumstance can be additionally promoted by turning down the modulation during the sine amplitude of the network.

The resonance of the coil L1 and of the capacitor C3 lies significantly below the frequency of the pulse-width modulation, so that the transformer T1 designed for the mains frequency is not unnecessarily magnetized with the switching frequency and high-frequency network disturbances are avoided.

When the transformer T1 has only one secondary winding to which the user R1 is connected, then regulation is carried out such that the voltage of the secondary winding (amplitude, effective value) meets the required criteria. When a number of secondary windings are present at the transformer T1 with variable loads situated thereat and when the voltage of only one secondary winding of the transformer T1 is regulated, a secondary winding that is lightly loaded at the moment could exhibit an over-voltage.

In order to prevent this, an additional, unloaded test winding can be provided for the regulator with which only the voltage loss in the primary winding of the transformer T1 is acquired and can be leveled (for example, the winding with U2 in FIG. 2).

The voltage load of the switch elements S1 through S4 during operation is only as high as the voltage at the capacitor C1. The switch elements S1 through S4 thus need not withstand the mains voltage. The switching losses, consequently, are also correspondingly low. When the circuit is connected to the mains voltage, then the initial condition (for example, switches S1 and S3 switched on and the switches S2 and S4 switched off) should be present or a pulse-width modulation should already ensue since the switched power pack part 1 must withstand the full mains voltage given open switches S1 through S4, unless a protective circuit, for example in the form of a DIAC that bridges the outputs of the bridge circuit, is installed.

Figure 6:
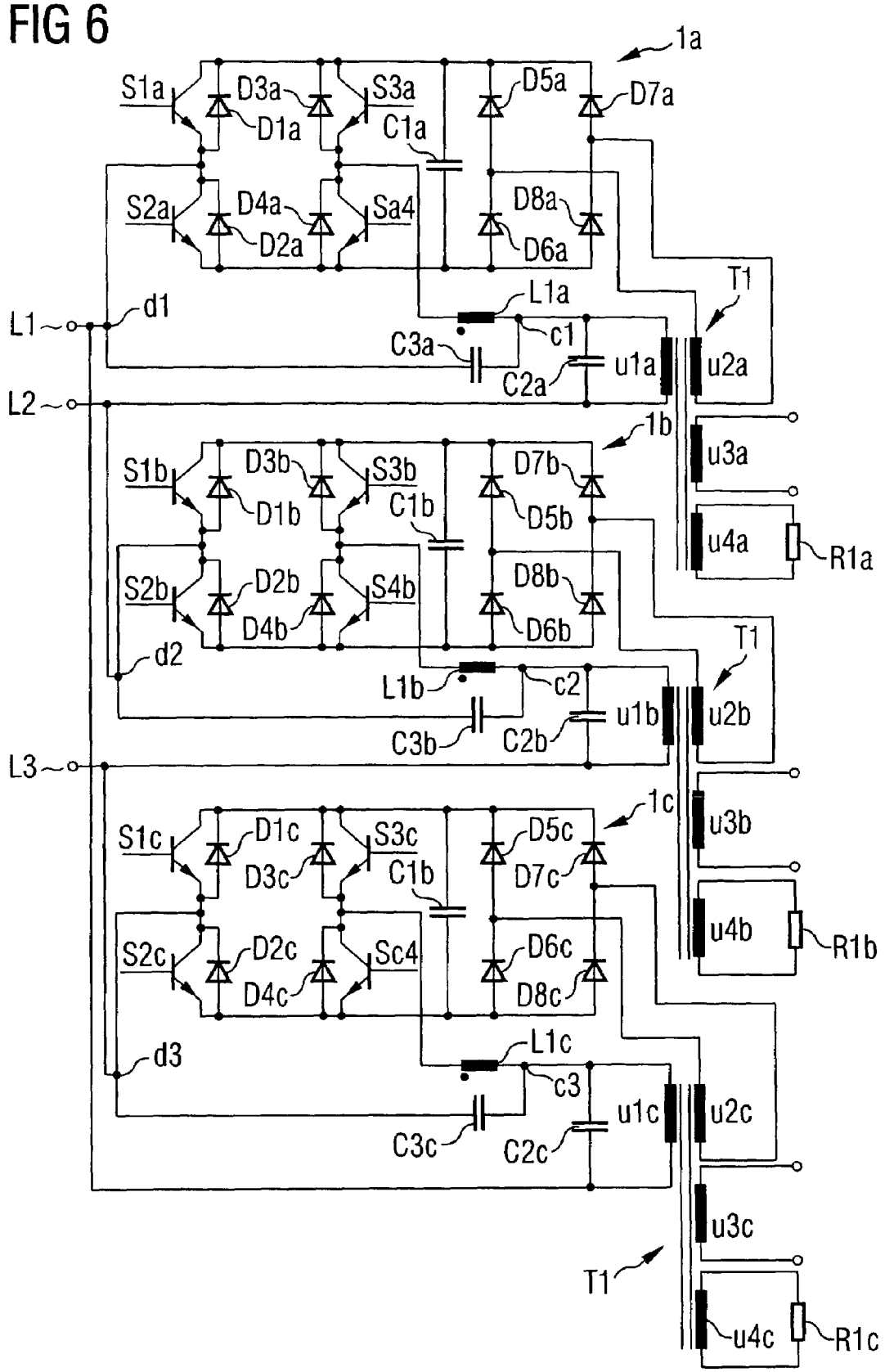
FIG. 6 is a fourth detailed version of the embodiment according to the third exemplary embodiment.

FIG. 6 shows the inventive circuit adapted for a three-phase transformer T1 in a delta connection. The circuit is obtained from three circuits according to FIG. 4. The corresponding outer conductors L1, L2 and L3 are connected to the outputs D1, D2, D3 of the switched power pack parts 1a, 1b, 1c; the neutral conductor N is eliminated.

The three legs of the three-phase transformer T1 are magnetically coupled. Three separate control circuits can easily mutually influence one another. This can be avoided when only one regulator is present that, for example, then regulates to the maximum value or the average value of the secondary voltage U3a, U3b, U3c and prescribes the pulse-width modulation for the three bridge circuits 1a, 1b, 1c.

The circuit for a three-phase transformer T1 in star connection is obtained from three circuits corresponding to FIG. 2, 3, 4 or 5.

The invention is not limited to the examples that have been described. Thus, for example, it is also possible to utilize the switched power pack 1 described in FIG. 1 in the circuit described in FIG. 4 or, respectively, 5.

Although modifications and changes may be suggested by those skilled in the art, it is the intention of the inventor to embody within the patent warranted hereon all changes and modifications as reasonably and properly come within the scope of his contribution to the art.

I claim as my invention:

1. A stabilization circuit for compensating voltage fluctuations at a user device containing device circuitry supplied with a mains voltage available across mains voltage poles, said device circuitry having two inputs and exhibiting a load voltage, said stabilization circuit comprising:

a transformer having a primary winding and a secondary winding;

a switched power pack having an input and two outputs;

said primary winding of said transformer being adapted for connection across said mains voltage poles, and said secondary winding being connected to said input of said switched power pack;

one of the outputs of said switched power pack being adapted for connection to one of said mains voltage poles;

another of said outputs of said switched power pack being adapted for connection to said one of said inputs of said device circuitry;

a connection line adapted to connect another of the inputs of said device circuitry to another of said mains voltage poles;

said outputs of said switched power pack supplying, upon occurrence of a fluctuation in at least one of said mains voltage and said load voltage, a voltage to said device circuitry, in series with said mains voltage; and said switched power pack having another input connected to said secondary winding of said transformer and, in said switched power pack, said another input connected to said secondary winding of said transformer being connected to said output adapted for connection to said another of said mains voltage poles, and said switched power pack, dependent on said fluctuation, selectively connecting said output adapted for connection to the device circuitry to said output adapted for connection to said one of said mains voltage poles or to said another input of said switched power pack connected to said secondary winding of said transformer.

2. A stabilization circuit as claimed in claim 1 wherein said switched power pack comprises a rectifier circuit for rectifying a voltage across said secondary winding of said transformer, and a bridge circuit, formed by a plurality of switch elements, for cutting in the voltage rectified by said rectifier circuit, said bridge circuit having an input connected to an output of said rectifier circuit, and said bridge circuit having an output coupled to said outputs of said switched power pack.

3. A stabilization circuit as claimed in claim 2 wherein said rectifier circuit includes a charging capacitor.

4. A stabilization circuit as claimed in claim 2 wherein said switched power pack further comprises a filter coupled to said output of said bridge circuit.

5. A stabilization circuit as claimed in claim 2 wherein said bridge circuit performs pulse width modulation of said voltage rectified by said rectifier circuit dependent on a voltage drop at said device circuitry.

6. A stabilization circuit as claimed in claim 5 wherein said switched power pack comprises an inductive converter connecting said input of said bridge circuit to said output of said rectifier circuit, said bridge circuit pulse-width modulating said inductive converter dependent on said voltage drop at said device circuitry.

7. A stabilization circuit for compensating voltage fluctuations at a user device containing device circuitry supplied with a mains voltage available across mains voltage poles, said device circuit exhibiting a load voltage, said stabilization circuit comprising:
   a transformer having a primary winding with two terminals, a first secondary winding adapted for connection to said device circuitry, and a second secondary winding;
   a switched power pack having an input connected to said second secondary winding, and having two outputs;
   one of said terminals of said primary winding of said transformer being connected to one of said outputs of said switched power pack;
   another of said terminals of said primary winding of said transformer being adapted for connection to one of said mains voltage poles;
   another of said outputs of said switched power pack being adapted for connection to another of said mains voltage poles;
   said outputs of said switched power pack supplying, upon occurrence of a fluctuation in at least one of said mains voltage and said load voltage, a voltage to said device circuitry, in series with said mains voltage;
   said switched power pack having another input connected to said second secondary winding of said transformer and, in said switched power pack, said another input connected to said second secondary winding of said transformer being connected to the output adapted for connection to said another of said mains voltage poles, and said switched power pack, dependent on said fluctuation, selectively connecting said output connected to said one of said terminals of said primary winding of said transformer to the output of said switched power pack adapted for connection to said one of said mains voltage poles or to said another input of said switched power pack connected to said second secondary winding of said transformer.

8. A stabilization circuit as claimed in claim 7 wherein said switched power pack comprises a rectifier circuit for rectifying a voltage across said secondary winding of said transformer, and a bridge circuit, formed by a plurality of switch elements, for cutting in the voltage rectified by said rectifier circuit, said bridge circuit having an input connected to an output of said rectifier circuit, and said bridge circuit having an output coupled to said outputs of said switched power pack.

9. A stabilization circuit as claimed in claim 8 wherein said rectifier circuit includes a charging capacitor.

10. A stabilization circuit as claimed in claim 8 wherein said switched power pack further comprises a filter coupled to said output of said bridge circuit.

11. A stabilization circuit as claimed in claim 8 wherein said bridge circuit performs pulse width modulation of said voltage rectified by said rectifier circuit dependent on a voltage drop at said device circuitry.

12. A stabilization circuit as claimed in claim 11 wherein said switched power pack comprises an inductive converter connecting said input of said bridge circuit to said output of said rectifier circuit, said bridge circuit pulse-width modulating said inductive converter dependent on said voltage drop at said device circuitry.

* * * * *